(12) United States Patent  
Oh

(10) Patent No.: US 7,965,492 B2
(45) Date of Patent: *Jun. 21, 2011

(54) METAL CAPACITOR AND MANUFACTURING METHOD THEREOF

(76) Inventor: Young Joo Oh, Seoul (KR)

( * ) Notice: Subject to any disclaimer, the term of this patent is extended or adjusted under 35 U.S.C. 154(b) by 473 days.

This patent is subject to a terminal disclaimer.

(21) Appl. No.: 12/155,772

(22) Filed: Jun. 10, 2008

(65) Prior Publication Data

US 2009/0103233 A1    Apr. 23, 2009

(30) Foreign Application Priority Data

Oct. 19, 2007 (KR) ................. 10-2007-0105717
May 23, 2008 (KR) ................. 10-2008-0048003

(51) Int. Cl.
*H01G 4/005* (2006.01)
*H01G 4/06* (2006.01)

(52) U.S. Cl. ....................... 361/303; 361/311

(58) Field of Classification Search .......... 361/303–305, 361/311

See application file for complete search history.

(56) References Cited

U.S. PATENT DOCUMENTS

| 6,166,899 | A | 12/2000 | Tamamitsu |
| 7,626,802 | B2 * | 12/2009 | Oh ............................. 361/301.4 |
| 2004/0049899 | A1 * | 3/2004 | Fujii et al. .................... 29/25.03 |

\* cited by examiner

*Primary Examiner* — Eric Thomas
(74) *Attorney, Agent, or Firm* — Rosenberg, Klein & Lee

(57) ABSTRACT

A metal capacitor with improved electric conductivity includes a metal member having a through-hole forming portion where a plurality of through-holes are formed, an electrode withdrawing portion formed on the through-hole forming portion, and a sealing portion. The metal capacitor includes a metal oxide layer being formed on the metal member and a main electrode layer formed on the metal oxide layer that is formed on the through-hole forming portion of the metal member, to fill the plurality of through-holes. The metal capacitor further includes an insulating layer formed on the main electrode layer and the metal member to externally expose the electrode withdrawing portion of the metal member.

12 Claims, 6 Drawing Sheets

METAL CAPACITOR AND MANUFACTURING METHOD THEREOF

BACKGROUND

1. Field

The present invention relates to a metal capacitor and a manufacturing method thereof, and more particularly, to a metal capacitor in which an electric conductivity is significantly improved by applying a metal material for an electrolyte and a manufacturing method thereof.

2. Background

An aluminum electrolytic capacitor is used to smooth a power output from a power circuit to be a predetermined value, or is used as a low frequency bypass. Hereinafter, a method of manufacturing the aluminum electrolytic capacitor will be briefly described.

An etching process of etching the surface of an aluminum foil is performed to enlarge a surface area of the aluminum foil and thereby increase an electric capacity. When the etching process is completed, a forming process of forming a dielectric substance on the aluminum foil is performed. When cathode and anode aluminum foils are manufactured through the etching process and the forming process, a slitting process of cutting the manufactured aluminum foil and a separator by as long as a desired width based on the length of a product is performed. When the slitting process is completed, a stitching process of stitching an aluminum lead patch, which is a lead terminal, to the aluminum foil is performed.

When the slitting of the aluminum foil and the separator is completed, a winding process of disposing the separator between the anode aluminum foil and the cathode aluminum foil, and then winding the separator and the aluminum foils in a cylindrical shape and attaching a tape thereto, so as to not be unwounded. When the winding process is completed, an impregnation process of inserting the wound device into an aluminum case and injecting an electrolyte is performed. When the injecting of the electrolyte is completed, a curing process of sealing the aluminum case using a sealing material is performed. When the curling process is completed, an aging process of restoring a damage to the dielectric substance is performed. Through this, the assembly of the aluminum electrolytic capacitor is completed.

Due to the current development in digitalization and thinness of electronic devices, when applying the conventional aluminum electrolytic capacitor, there are some problems as follow.

Since the aluminum electrolytic capacitor uses the electrolyte, an electric conductive is comparatively low and thus a lifespan of the aluminum electrolytic capacitor is reduced in a high frequency area. Also, there are some constraints on improvement of reliability, a high frequency response, a low equivalent series resistance (ESR), and impedance. Also, due to a comparatively high ripple pyrexia, there are some constraints on stability and environments, such as fuming and firing.

SUMMARY OF THE INVENTION

The present invention is conceived to solve the above-described problems and thus provides a metal capacitor in which an electric conductivity is improved by about 10,000 to 1,000,000 folds by applying a metal material for an electrolyte, in comparison to when using a conventional electrolyte or an organic semiconductor, a multi-layer metal capacitor using the metal capacitor, and a manufacturing method thereof.

The present invention also provides a metal capacitor which can improve a miniature, a low equivalent series resistance (ESR), a reduction in a ripple pyrexia, a long life, a heat-resistant stability, non-fuming, non-firing, and environment by using a metal material for an electrolyte, and a manufacturing method thereof.

According to an aspect of the present invention, there is provided: a metal capacitor including: a metal member comprising a through-hole forming portion where a plurality of through-holes is formed, an electrode withdrawing portion formed on the through-hole forming portion, and a sealing portion; a metal oxide layer being formed on the metal member; an insulating layer being formed on the metal member to externally expose the electrode withdrawing portion of the metal member; a main electrode layer being formed on the metal oxide layer that is formed on the through-hole forming portion of the metal member, to fill the plurality of through-holes/

According to another aspect of the present invention, there is provided a method of manufacturing a metal capacitor, including forming a through-hole forming portion that includes a plurality of through-holes on both surfaces to thereby form a metal member integrally formed with an electrode withdrawing portion and a sealing portion by using a direct current (DC) etching; forming a metal oxide layer on the metal member by using an anodizing way, when the through-hole forming portion, the electrode withdrawing portion, and the sealing portion are integrally formed on the metal member; forming an insulating layer on the main electrode layer and/or the metal member to externally expose the electrode withdrawing portion of the metal member by using a chemical vapor deposition (CVD); and, forming a main electrode layer on the metal oxide layer to fill in the plurality of through-holes formed in the through-hole forming portion of the metal member by using an electroless planting or an electroplating.

BRIEF DESCRIPTION OF THE DRAWINGS

The embodiments will be described in detail with reference to the following drawings in which like reference numerals refer to like elements wherein.

DETAILED DESCRIPTION

First Embodiment

Hereinafter, a configuration of a metal capacitor according to a first embodiment of the present invention will be described with reference to FIGS. 1 through 3.

Figure 1:
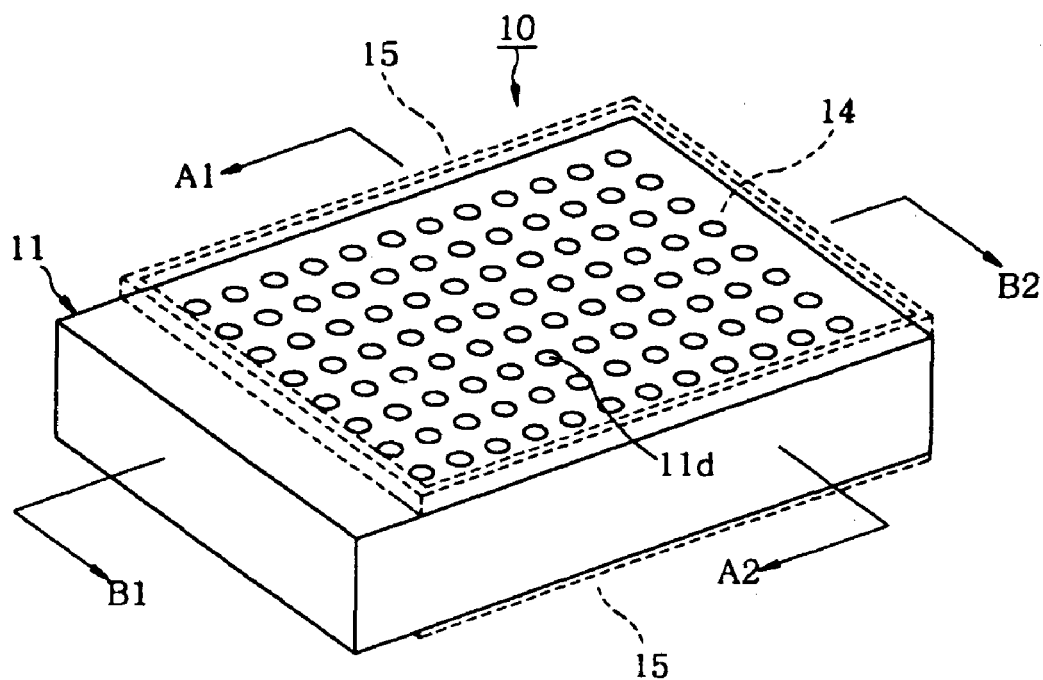
FIG. 1 is a perspective view of a metal capacitor according to a first embodiment of the present invention.
Figure 2:
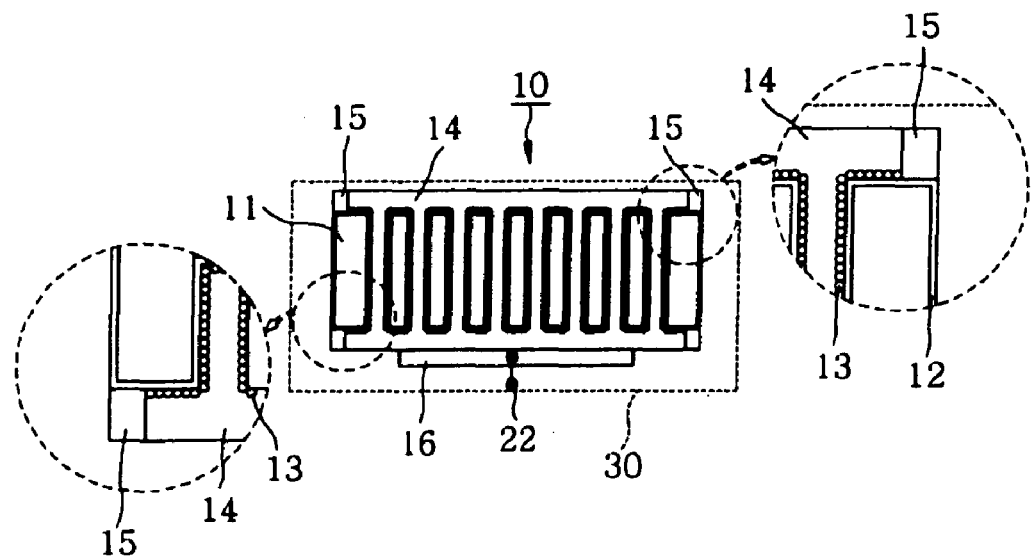
FIG. 2 is a cross-sectional view cut along A1-A2 line of the metal capacitor shown in FIG. 1.
Figure 3:
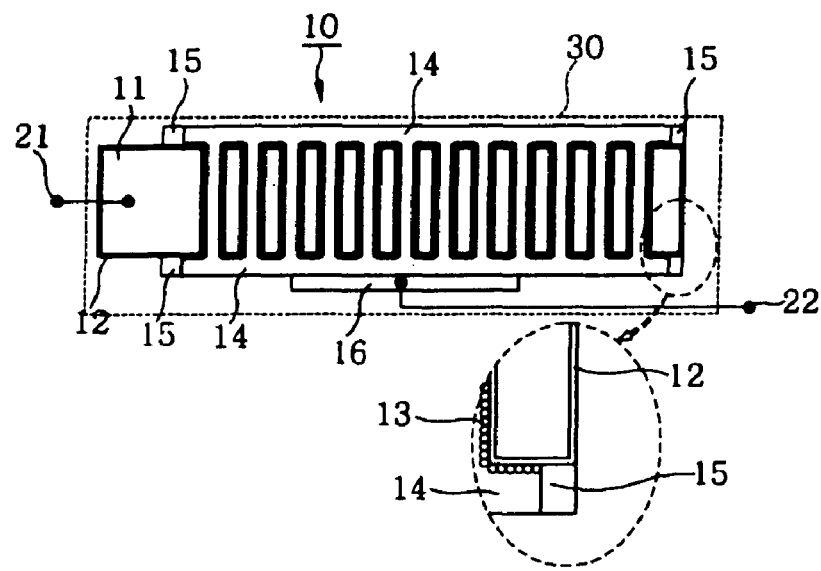
FIG. 3 is a cross-sectional view cut along B1-B2 of the metal capacitor shown in FIG. 1.

FIG. 1 is a perspective view of a metal capacitor 10 according to the first embodiment of the present invention, FIG. 2 is a cross-sectional view cut along A1-A2 line of the metal capacitor 10 shown in FIG. 1, and FIG. 3 is a cross-sectional view cut along B1-B2 of the metal capacitor 10 shown in FIG. 1. As shown in the figures, the metal capacitor 10 according to the first embodiment of the present invention includes a metal member 11, a metal oxide layer 12, a seed electrode layer 13, a main electrode layer 14, an insulating layer 15, a first lead terminal 21, a second lead terminal 22, and a sealing member 30.

Hereinafter, the configuration thereof will be sequentially described.

Figure 4A:
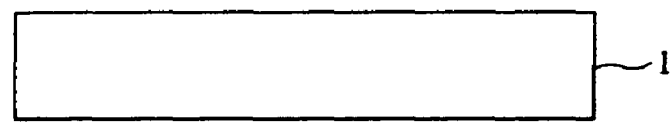
FIGS. 4A through 4G are cross-sectional views illustrating a method of manufacturing the metal capacitor according to the first embodiment of the present invention.
Figure 4B:
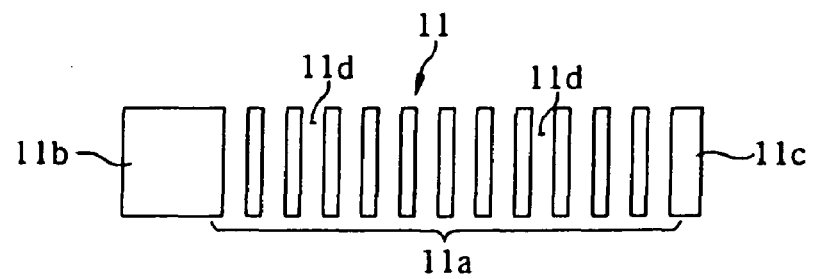

As shown in FIG. 4B, the metal member 11 includes a through-hole forming portion 11a that is provided by arranging a plurality of through-holes 11d on its both surfaces, and an electrode withdrawing portion 11b and a sealing portion 11c that are formed in one end and another end of the through-hole forming portion 11a. The through-hole forming portion 11a, the electrode withdrawing portion 11b, and the sealing portion 11c are integrally formed. The metal member 11 that is formed with the plurality of through-holes 11d may use various types of metal materials, for example, any one of aluminum (Al), niobium (Nb), tantalum (Ta), titanium (Ti), and zirconium (Zr). The plurality of through-holes 11d that is formed in the through-hole forming portion 11a of the metal member 11 may be formed in the shape of a circle or a polygon.

The metal oxide layer 12 is formed on the metal member 11. As shown in FIG. 11, the metal oxide layer 12 is formed on the whole surface of the metal member 11 and uses any one of alumina($Al_2O_3$), niobium pentoxide(Nb2O5), niobium monoxide(NbO), tantalum pentoxide(Ta205), titanium dioxide (TiO2), and zirconium dioxide(ZrO2) according to the material of the metal member 11.

The insulating layer 15 is formed on a metal member 11 so that the electrode withdrawing portion 11b of the metal member 11 may be externally exposed. The insulating layer 15 can be formed after forming a plurality of main electrode layers 14. Thus, the insulating layer 15 is formed on a metal member 11 and/or a main electrode layer 14. As shown in FIG. 4D, the insulating layer 15 is formed on the sealing portion 11c corresponding to the electrode withdrawing portion 11b, the top and bottom surfaces of the through-hole forming portion 11a, and the main electrode layer 14. In this instance, the insulating layer 15 formed on the metal member 11 and/or the main electrode layer 14 uses an insulating tape or a resin-based material.

The seed electrode layer 13 is formed on the metal oxide layer 12 that is formed in the through-hole forming portion 11a of the metal member 11. As shown in FIGS. 1 through 3 and FIG. 4E, the seed electrode layer 13 is formed on the metal oxide layer 12 that is formed with the through-holes 11d, including the surface of the plurality of through-holes 11d. However, the seed electrode layer 15 may be removed and not be applied depending on requirement of the user.

The main electrode layer 14 is formed on the seed electrode layer 13 formed on the through-hole forming portion 11a to fill in the plurality of through-holes 11d formed on the through-hole forming portion 11a of the metal member 11. The main electrode layer 14 is formed on each of both surfaces, that is, top and bottom surfaces of the through-hole forming portion 11a, when the plurality of through-holes 11d is filled. Each of the main electrode layer 14 formed on the seed electrode layer 13, and the seed electrode layer 13 uses any one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au).

The first lead terminal 21 is connected to the electrode withdrawing portion 11b of the metal member 11. The second lead terminal 22 is connected to the main electrode layer 14.

In order to improve the adhesiveness of the second lead terminal 22 connected to the main electrode layer 14, a conductive adhesive layer 16 is further provided to connect the second lead terminal 22 to any one surface of the main electrode layer. The metal member 11 connected to the first and the second lead terminals 21 and 22, is sealed by the sealing member 30. The sealing member 30 may adopt a molding material or a cover member with an empty inside to seal the metal member 11, so that the first and the second lead terminals 21 and 22 may be externally exposed.

Hereinafter, a manufacturing method of the metal capacitor 10 according to the first embodiment will be described with reference to the accompanying drawings.

As shown in FIGS. 4A and 4B, when a member 1 such as layer, foil, etc., of a metal material is provided, the through-hole forming portion 11a where the plurality of through-holes 11d is arranged on both surfaces of the member 1 is formed and thereby the metal member 11 integrally formed with the electrode withdrawing portion 11b and the sealing portion 11c on one end and the other end is formed by a DC etching.

The DC etching performs a pre-processing process for the member 1 in an aqueous solution with about 1% of phosphoric acid in the temperature of about 40° C. through 60° C. during about one through three minutes, and performs first etching in the mixture of sulfuric acid, phosphoric acid, aluminum, etc. in the temperature of about 70° C. through 90° C. during about two through five minutes. In this case, the current density is about 100 mA/cm$^2$ through 400 mA/cm$^2$. The DC etching performs second etching in the mixture of nitric acid, phosphoric acid, aluminum, etc., in the temperature of about 75° C. through 85° C. during five through ten minutes. In this case, the current density is about 10 mA/cm$^2$ through 100 mA/cm$^2$. When the first etching and the second etching are completed, chemical cleaning is performed in the solution of nitric acid 30 g through 70 g/l in the temperature of about 60° C. through 70° C. during about ten minutes.

When forming the plurality of through-holes 11d in the through-hole forming portion 11a, each through hole 11d is formed in a cylindrical shape or a polygone shape to be passed through and to have a diameter of about 1 μm through about 100 μm. In addition to the DC etching, the through-holes 11d may be readily formed using a wet etching, a mechanical drill, or a laser drill.

Figure 4C:
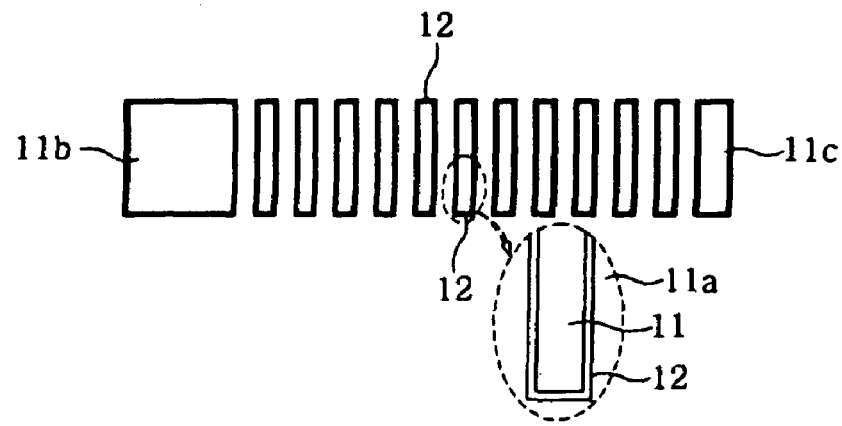
Figure 4D:
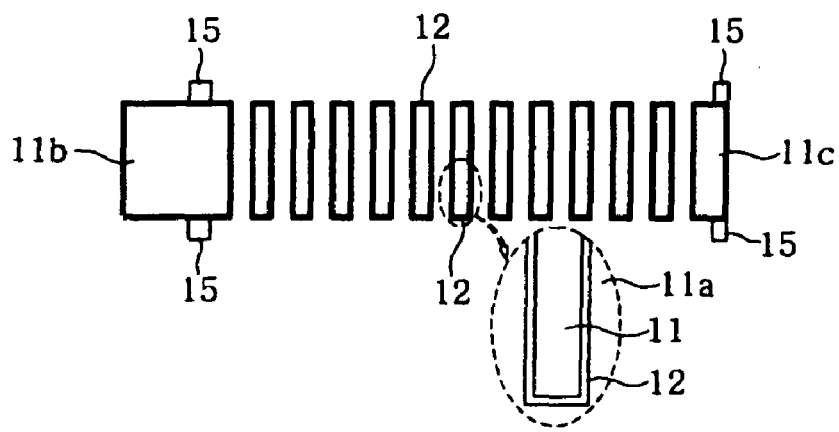

As shown in FIG. 4C, when the through-hole forming portion 11a, the electrode withdrawing portion 11b, and the sealing portion 11c are integrally formed on the metal member 11, a forming process of forming the metal oxide layer 12 on the metal member 11 by using an anodizing way is performed.

The anodizing method initially performs a boiling process in the temperature of about 80° C. through 100° C. during one through fifteen minutes in a deionized water, proceeds first oxidation in an aqueous solution of boric acid and boric acid-ammonium with 120 through 150 voltages, and proceeds a plurality of, two or three times of oxidations with changing the concentration and the voltage of the aqueous solution. The anodizing method performs a thermal treatment in the predetermined temperature, for example, in the temperature of 400° C. through 600° C. to perform a reforming process. Also, the anodizing method proceeds a by-product treatment in order to disposal and remove the by-product generated in the reforming process. Also, the anodizing method repeats the reforming process and the thermal treatment and proceeds a predetermined cleaning process in order to clean boric acid or phosphoric acid.

As shown in FIG. 4D, a through type metal member 10a is formed by forming the insulating layer 15 on the main electrode layer 14 and/or the metal member 11 by using a CVD (Chemical Vapor Deposition), so that the electrode withdrawing portion 11b of the metal member 11 may be externally exposed. Although the CVD is used herein, it is possible to apply any one of dipping process using an insulating resin or insulating ink, a spray process using ink-jet printing or screen printing, and a stamping process.

Figure 4E:
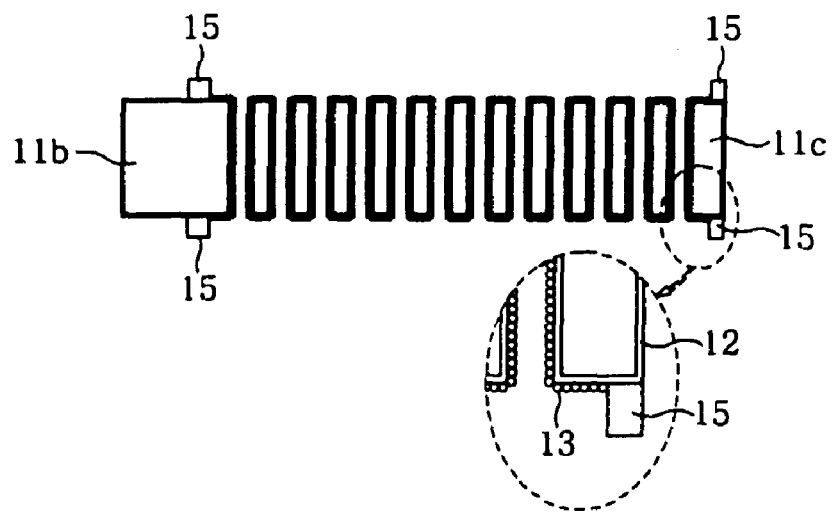

As shown in FIG. 4E, a seed electrode layer 13 is formed on the metal oxide layer 12 that is formed in the through-hole forming portion 11a to be penetrated into the metal oxide layer 12 by using an electroless plating or an electroplating. However, the seed electrode layer 13 may be removed and not be applied depending on requirement of the user.

The manufacturing method deposits a predetermined amount of palladium sulfate aqueous solution as an activator during 10 through 300 seconds in the seed electrode layer forming process and removes the activator of surface thereof by dipping and cleaning during one through thirty seconds at the normal temperature. Nickel phosphate aqueous solution applies in the nickel electroless plating and plates during about five through twenty minutes by adjusting pH range (4 through 8 pH) and temperature (50° C. through 80° C.). In this case, the seed electrode layer 13 forms in an inner part of the through-holes 11d. An additional plating process and a dry process less than 100° C. may be performed depending on requirement of a user.

Figure 4F:
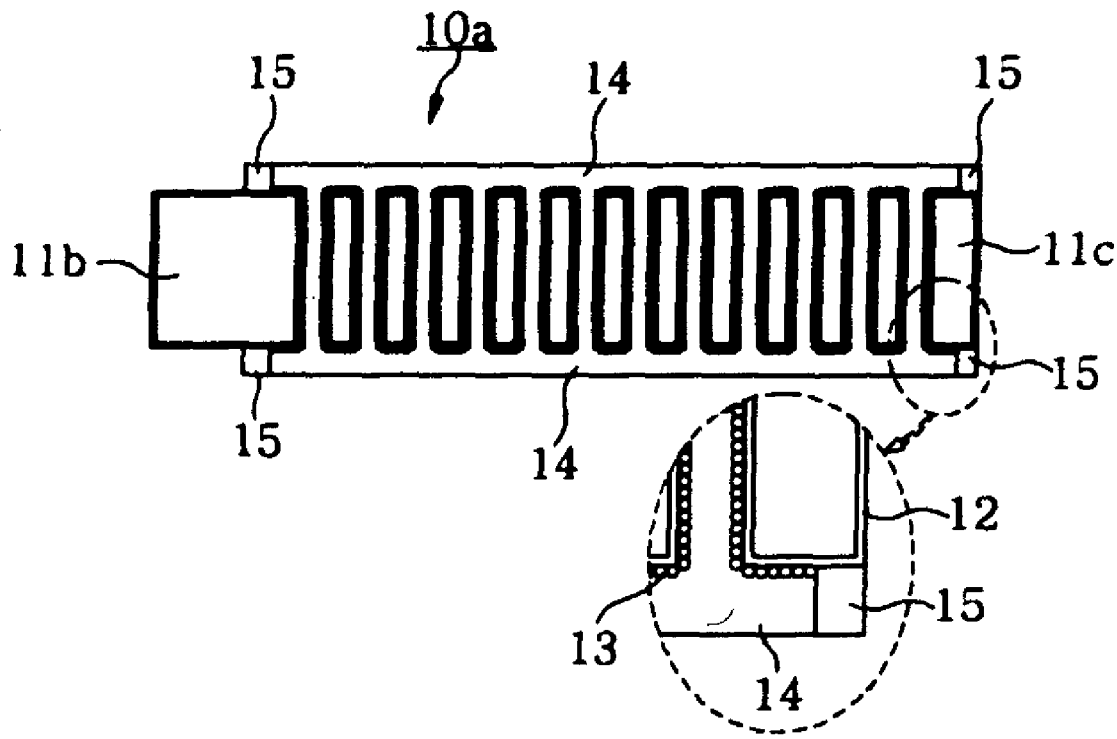

As shown in FIG. 4F, a main electrode layer 14 is formed to fill in the plurality of through-holes 11d formed in the through-hole forming portion 11a of the metal member 11 by using the seed electrode layer 13 as media, by using the electroless plating or the electroplating.

In the electroplating for forming the main electrode layer 14, the electroplating method adjusts pH range (1 through 5 pH) and temperature (30° C. through 70° C.) and applies D.C(Direct Current) with current density of 20 through 120 mA/cm$^2$ in sulfuric acid nickel aqueous solution or nickel chloride aqueous solution.

In the electroless plating for forming the main electrode layer 14, the electroless plating method adjusts pH range (5 through 7 pH) and temperature (70° C. through 90° C.) and proceeds material having seed electrode layer 13 during about ten through thirty minutes and removes plating solution components of surface thereof by dipping and cleaning during one through thirty seconds at the normal temperature.

Figure 4G:
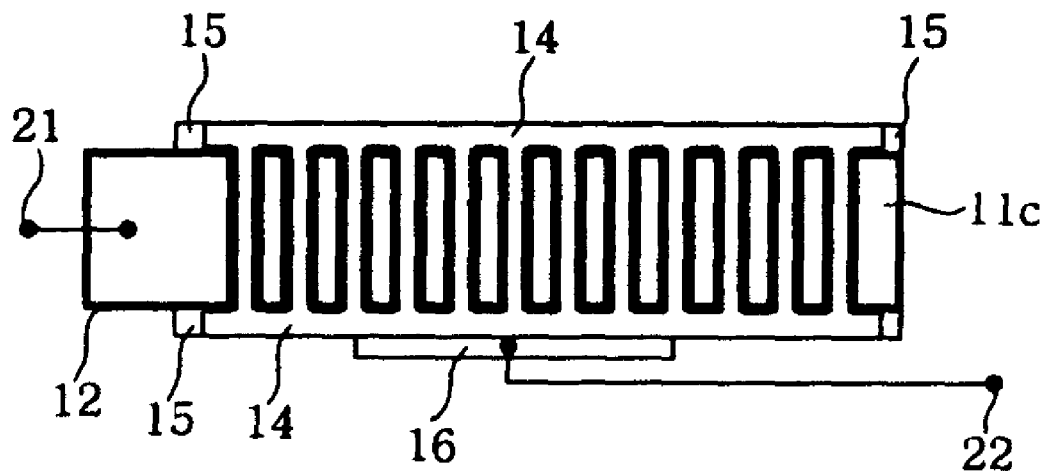

As shown in FIG. 4G, the first and the second lead terminals 21 and 22 are connected to the electrode withdrawing portion 11b of the metal member 11 and the main electrode layer, respectively. A process of forming the conductive adhesive layer 16 is further provided in connecting of the first and the second lead terminals 21 and 22 in order to improve the adhesiveness of the first and the second lead terminals 21 and 22. In this instance, The method of forming the conductive adhesive layer 16 uses any one of a method of spraying metal adhesives or solder paste, the electroplating, and the electroless plating.

As shown in FIG. 3, when the first and the second lead terminals 21 and 22 are connected, the metal member 11 is sealed with the sealing member 30 so that the first and the second lead terminals 21 and 22 may be externally exposed. When sealing the metal member 11 with the sealing member 30, the metal member 11 is sealed using molding material or a cover member with an empty inside.

Embodiment 2

A non-polar metal capacitor 110 using the through type metal member 10a constituting the metal capacitor 10 according to the first embodiment of the present invention will be described with reference to the accompanying drawing.

Figure 5:
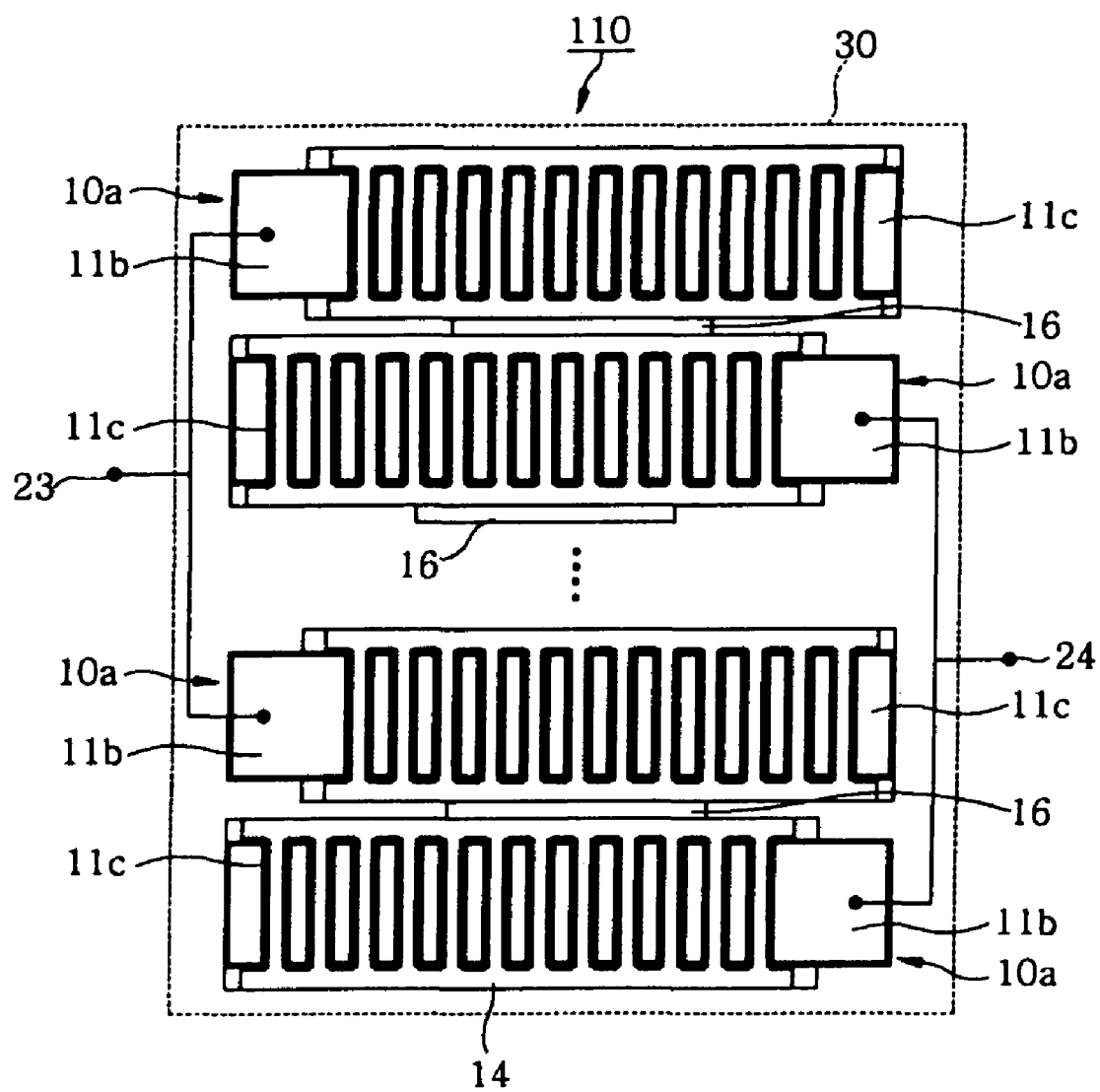
FIG. 5 is a cross-sectional view of a metal capacitor according to a second embodiment of the present invention.

As shown in FIG. 5, the metal capacitor 110 according to the second embodiment of the present invention includes a plurality of through type metal members 10a, a conductive adhesive layer 16, a third lead terminal 23, a fourth lead terminal 24, and a sealing member 30. Hereinafter, the configuration thereof will be sequentially described.

Each of the plurality of through type metal members 10a includes the metal member 11, the metal oxide layer 12, the seed electrode layer 13, the main electrode layer 14, and the insulating layer 15. The configuration thereof is the same as the configuration of the through-type metal member 10a of FIG. 4D, and thus further detailed descriptions will be omitted here. As shown in FIG. 5, the plurality of through type metal members 10a is disposed in turn to make the electrode withdrawing portion 11b face one direction and another direction.

The conductive adhesive layer 16 is disposed between the main electrode layers 14 of the plurality of through type metal members 10a and thereby adheres the plurality of through type metal members 10a. The third lead terminal 23 is connected to the electrode withdrawing portion 11b of the through type metal member 10a that faces one end, and the fourth lead terminal 24 is connected to the electrode withdrawing portion 11b of the through type metal member 10a that faces the other end. Through this, the non-polar metal capacitor 110 is constructed. Specifically, since each of the third and the fourth lead terminals 23 and 24 is connected to the electrode withdrawing portion 11b of the through type metal member 10a formed with the metal oxide layer 12 having the same polarity. Accordingly, the metal capacitor 110 is constructed to have the non-polarity.

When the third and the fourth lead terminals 23 and 24 are connected, the sealing member 30 seals the plurality of through type metal members 10a so that the third and the fourth lead terminals 23 and 24 may be externally exposed. Through this, it is possible to protect the plurality of through type metal members 10a from an outside.

Embodiment 3

A polar metal capacitor 120 using the through type metal member 10a constituting the metal capacitor 10 according to the first embodiment of the present invention will be described with reference to the accompanying drawing.

Figure 6:
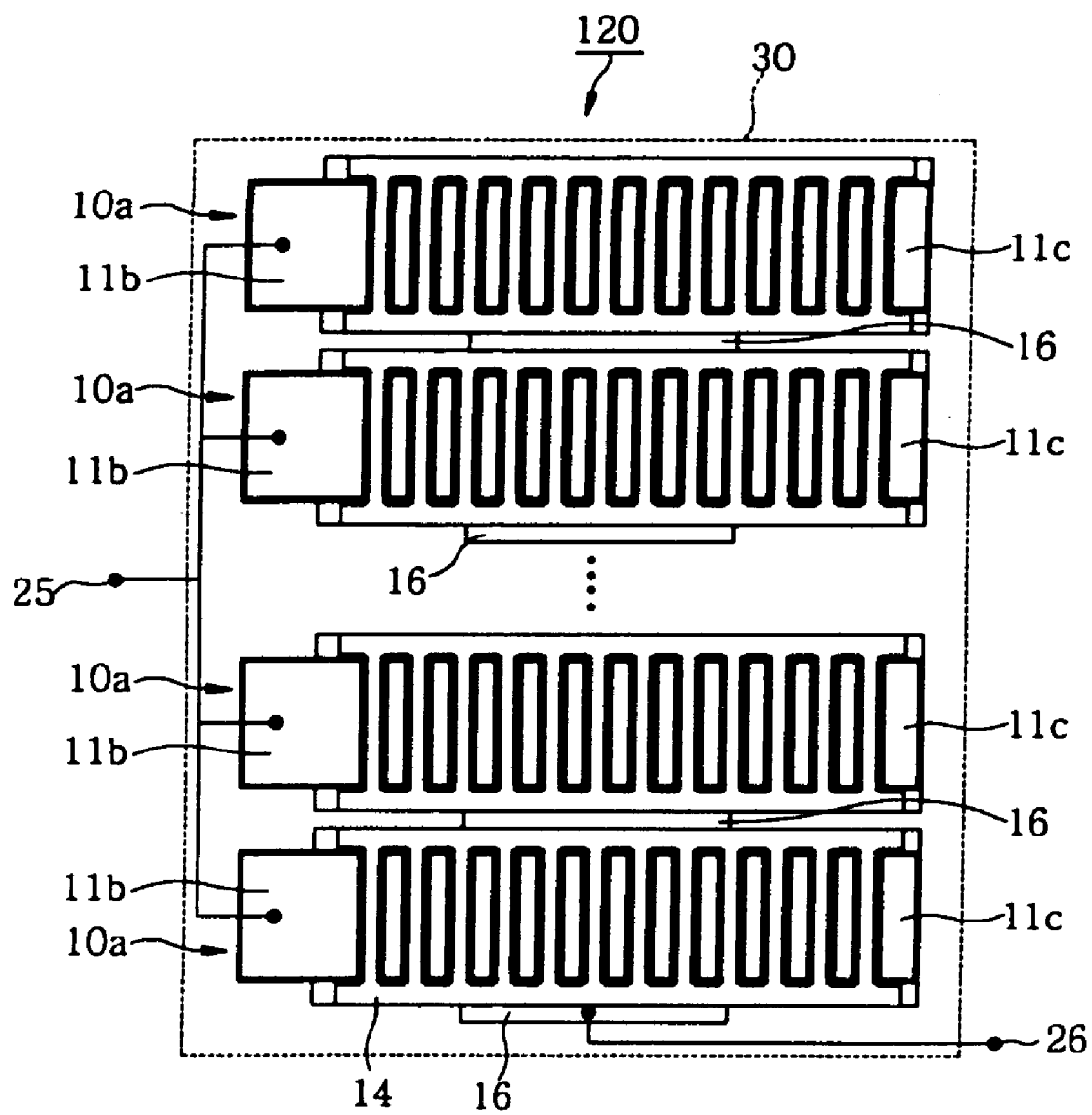
FIG. 6 is a cross-sectional view of a metal capacitor according to a third embodiment of the present invention.

As shown in FIG. 6, the polar meal capacitor 120 according to the third embodiment of the present invention includes a plurality of through type metal members 10a, a conductive adhesive layer 16, a first polar lead terminal 25, a second polar lead terminal 26, and a sealing member 30. Hereinafter, the configuration thereof will be sequentially described.

As shown in FIG. 5, each of the plurality of through type metal members 10a includes the metal member 11, the metal oxide layer 12, the seed electrode layer 13, the main electrode layer 14, and the insulating layer 15. The configuration thereof is the same as the configuration of the through type metal member 10a of FIG. 4D, and thus further detailed descriptions will be omitted here. As shown in FIG. 6, the plurality of through type metal members 10a is disposed in turn to make the electrode withdrawing portion 11b face the same direction.

The conductive adhesive layer 16 is interposed between the main electrode layers 14 of the plurality of type metal members 10a and thereby adheres the plurality of through type metal members 10a. The first polar lead terminal 25 is connected to the electrode withdrawing portions 11b of the through type metal member 10a that faces one end and the first polar lead terminal 25 is connected to the electrode withdrawing portion 11b of the metal member 11 formed with the metal oxide layer 12 to function as an anode electrode. The second polar lead terminal 26 is connected to one main electrode layer 14 of the plurality of through type metal members 10a and is connected to the main electrode layer 14 not formed with the metal oxide layer 12 and thus functions as a cathode electrode. Through this, the metal capacitor 120 may be constructed to have the polarity.

The metal member 11 that includes the electrode withdrawing portion 11b connected to the first polar lead terminal 25 may function as the negative electrode. When the metal member 11 functions as the negative electrode, the main electrode layer 14 functions as the positive electrode. Accordingly, when the second polar lead terminal 26 is applied to the cathode electrode, the first polar lead terminal 25 is applied to the anode electrode. Conversely, when the second polar lead terminal 26 is applied to the anode electrode, the first polar lead terminal 25 is applied to the cathode electrode. Also, when the first polar lead terminal 25 is applied to the cathode electrode, the second polar lead terminal 26 is applied to the anode electrode. Conversely, when the first polar lead terminal 25 is applied to the anode electrode, the second polar lead terminal 26 is applied to the cathode electrode.

When the second polar lead terminal 26 functioning as the anode or the cathode electrode is connected to one main electrode layer 14 of the plurality of through type meal members 10a, the conductive adhesive layer 16 is formed on the main electrode layer 14 in order to improve the adhesiveness. The second polar lead terminal 26 is connected to the conductive adhesive layer 16.

When constructing the metal capacitors 110 and 120 by disposing the metal capacitors 10 constructed as above, it is possible to obtain a metal capacitor with the high voltage and the high capacity. Also, since the through hole 11d passing through both surfaces, that is, top and bottom surfaces of the metal member 11 is formed in the metal member 11 of the metal capacitor 10, it is possible to automatically connect the main electrode layer 14 that is formed on the top/bottom surface of the metal member 11. In addition to DC etching, it is possible to regularly form and maintain the plurality of through holes 11d using a wet etching, a mechanical drill, or a laser drill. Accordingly, it is possible to improve the leakage current and withstanding voltage.

According to the present invention, it is possible to improve an electric conductivity by about 10,000 to 1,000,000 folds by applying a metal material for an electrolyte, in comparison to when using a conventional electrolyte or an organic semiconductor. Also, since the serial multi-laying is possible, high-voltage is enabled. Also, a relatively higher electrical safety is provided. Also, it is possible to improve a miniature, a low equivalent series resistance (ESR), a reduction in a ripple pyrexia, a long life, a heat-resistant stability, non-fuming, non-firing, and environment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A metal capacitor comprising:
    a metal member comprising a through-hole forming portion where a plurality of through-holes is formed, an electrode withdrawing portion being formed on the through-hole forming portion, and a sealing portion;
    a metal oxide layer being formed on the metal member;
    an insulating layer being formed on the metal member to externally expose the electrode withdrawing portion of the metal member;
    a seed electrode layer being formed on the metal oxide layer formed on the through-hole forming portion of the metal member;
    a main electrode layer being formed on the seed electrode layer formed on the through-hole forming portion to fill in the plurality of through-holes formed on the through-hole forming portion of the metal member;
    a first lead terminal being connected to the electrode withdrawing portion of the metal member;
    a second lead terminal being connected to the main electrode layer; and
    a sealing member sealing the metal member connected to the first and the second lead terminals to externally expose the first and the second lead terminals.

2. The metal capacitor of claim 1, wherein the metal member uses any one of aluminum (Al), niobium (Nb), tantalum (Ta), titanium (Ti), and zirconium (Zr).

3. The metal capacitor of claim 1, wherein the plurality of through-holes formed in the through-hole forming portion of the metal member is formed in the shape of a circle or a polygon.

4. The metal capacitor of claim 1, wherein the metal oxide layer uses any one of alumina($Al_2O_3$), niobium monoxide(NbO), niobium pentoxide($Nb_2O_5$), tantalum pentoxide($Ta_2O_5$), titanium dioxide($TiO_2$), and zirconium dioxide($ZrO_2$).

5. The metal capacitor of claim 1, wherein each of the seed electrode layer and the main electrode layer uses any one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au).

6. The metal capacitor of claim 1, wherein the main electrode layer further comprises a conductive adhesive layer for connecting the second lead terminal.

7. The metal capacitor of claim 1, wherein the sealing member is sealed by molding material or a cover member with an empty inside, the sealing member seals the metal member in any one of a planar or cylindrical shape, and in the case of sealing the metal member in the cylindrical shape, winds the metal member and then seals the wound metal member.

8. A metal capacitor comprising:

a plurality of through type metal members, each comprising: a metal member comprising a through-hole forming portion where a plurality of through-holes is formed, an electrode withdrawing portion being formed on the through-hole forming portion, and a sealing portion; a metal oxide layer being formed on the metal member; a seed electrode layer being formed on the metal oxide layer formed on the through-hole forming portion of the metal member; a main electrode layer being formed on the seed electrode layer formed on the through-hole forming portion to fill in the plurality of through-holes formed on the through-hole forming portion of the metal member; and an insulating layer being formed on the main electrode layer and/or the metal member to externally expose the electrode withdrawing portion of the metal member, wherein the electrode withdrawing portions are disposed in turn to face one direction and another direction;

a conductive adhesive layer being interposed between the main electrode layers of the plurality of through type metal members to adhere the plurality of through type metal members;

a third and a fourth lead terminals being connected to the electrode withdrawing portions of the plurality of through type metal members, respectively; and a sealing member sealing the plurality of through type metal members connected to the third and the fourth lead terminals to externally expose the third and the fourth lead terminals.

9. A metal capacitor comprising:

a plurality of through type metal members, each comprising: a metal member comprising a through-hole forming portion where a plurality of through-holes is formed, an electrode withdrawing portion being formed on the through-hole forming portion, and a sealing portion; a metal oxide layer being formed on the metal member; a seed electrode layer being formed on the metal oxide layer formed on the through-hole forming portion of the metal member; a main electrode layer being formed on the seed electrode layer formed on the through-hole forming portion to fill in the plurality of through-holes formed on the through-hole forming portion of the metal member; and an insulating layer being formed on the main electrode layer and/or the metal member to externally expose the electrode withdrawing portion of the metal member, wherein the electrode withdrawing portions are disposed in turn to face one direction and another direction;

a conductive adhesive layer being interposed between the main electrode layers of the plurality of through type metal members to adhere the plurality of through type metal members;

a first polar lead terminal being connected to the electrode withdrawing portions of the plurality of through type metal members;

a second polar lead terminal being connected to one of the main electrode layers of the plurality of through type metal members; and a sealing member sealing the plurality of through type metal members connected to the first and the second polar lead terminals to externally expose the first and the second polar lead terminals.

10. The metal capacitor of claim 9, wherein the first polar lead terminal is applied to an anode electrode when the second polar lead terminal is applied to a cathode electrode, and the first polar lead terminal is applied to the cathode electrode when the second polar lead terminal is applied to the anode electrode.

11. The metal capacitor of claim 9, wherein the second polar lead terminal is applied to an anode electrode when the first polar lead terminal is applied to a cathode electrode, and the second polar lead terminal is applied to the cathode electrode when the first polar lead terminal is applied to the anode electrode.

12. The metal capacitor of claim 9, wherein one of the main electrode layers of the plurality of through type metal members connected to the second polar lead terminal further comprises a conductive adhesive layer.

* * * * *